United States Patent
Lu

(10) Patent No.: US 11,736,047 B2
(45) Date of Patent: Aug. 22, 2023

(54) BLDC MOTOR CONTROLLER/DRIVER

(71) Applicant: Allegro MicroSystems, LLC, Manchester, NH (US)

(72) Inventor: Yisong Lu, Shrewsbury, MA (US)

(73) Assignee: Allegro MicroSystems, LLC, Manchester, NH (US)

( * ) Notice: Subject to any disclaimer, the term of this patent is extended or adjusted under 35 U.S.C. 154(b) by 47 days.

(21) Appl. No.: 16/819,765

(22) Filed: Mar. 16, 2020

(65) Prior Publication Data

US 2021/0091692 A1 Mar. 25, 2021

Related U.S. Application Data

(60) Provisional application No. 62/905,659, filed on Sep. 25, 2019.

(51) Int. Cl.
| | |
|---|---|
| *H02P 27/08* | (2006.01) |
| *H02P 6/28* | (2016.01) |
| *H02K 3/28* | (2006.01) |
| *H02P 6/16* | (2016.01) |

(52) U.S. Cl.
CPC .............. *H02P 6/28* (2016.02); *H02K 3/28* (2013.01); *H02P 6/16* (2013.01)

(58) Field of Classification Search
CPC .......... H02P 6/28; H02P 6/16; H02P 21/0025; H02P 6/08; H02P 21/0003; H02P 21/14; H02P 27/08; H02K 3/28; H02K 11/33; H02K 2213/03
See application file for complete search history.

(56) References Cited

U.S. PATENT DOCUMENTS

| | | | | | |
|---|---|---|---|---|---|
| 3,154,674 | A | * | 10/1964 | Tyzack | G05B 19/4105 708/847 |
| 3,177,423 | A | * | 4/1965 | Fuldner | H03M 1/485 323/340 |
| 3,178,563 | A | * | 4/1965 | Wedgwood | G05B 19/4105 318/573 |
| 3,287,545 | A | * | 11/1966 | Burnett | G05B 19/184 318/573 |
| 3,898,568 | A | * | 8/1975 | Barth | H03B 19/00 327/107 |
| 5,872,674 | A | | 2/1999 | Eddy | |
| 7,038,404 | B2 | * | 5/2006 | Kameyama | G03G 15/0194 318/34 |

(Continued)

FOREIGN PATENT DOCUMENTS

| | | |
|---|---|---|
| CN | 102868342 A | 1/2013 |
| DE | 10 2015 108 617 A2 | 12/2016 |
| TW | 201202879 A | 1/2012 |

OTHER PUBLICATIONS

U.S. Appl. No. 16/299,293, filed Mar. 12, 2019, Lu.

(Continued)

*Primary Examiner* — Muhammad S Islam
(74) *Attorney, Agent, or Firm* — Daly Crowley Mofford & Durkee, LLP

(57) ABSTRACT

Methods and apparatus to control a three-phase BLDC motor with a curve transformer having an index value for each stored input value and output value for providing stored corner points for outputs of the curve transformer. The curve transformer can output interpolated data for input data between adjacent ones of the input values.

25 Claims, 18 Drawing Sheets

(56) References Cited

U.S. PATENT DOCUMENTS

| | | | |
|---|---|---|---|
| 8,917,043 | B2 | 12/2014 | Reynolds et al. |
| 8,963,473 | B2 | 2/2015 | Lauwaert et al. |
| 9,203,339 | B2 | 12/2015 | Sato |
| 9,214,884 | B2 | 12/2015 | Sonoda et al. |
| 9,399,407 | B2 | 7/2016 | Zhou et al. |
| 9,843,285 | B1 | 12/2017 | Lu |
| 9,929,683 | B2 | 3/2018 | Sonoda et al. |
| 10,116,243 | B2 | 10/2018 | Lu et al. |
| 10,181,810 | B2 | 1/2019 | Lu et al. |
| 10,312,847 | B2 | 6/2019 | Lu |
| 10,326,389 | B2 | 6/2019 | Lu et al. |
| 10,348,223 | B1 | 7/2019 | Khosravi et al. |
| 10,651,767 | B2 | 5/2020 | Lu et al. |
| 2010/0001670 | A1* | 1/2010 | Scalese ............... H02P 6/34 318/400.09 |
| 2012/0007529 | A1* | 1/2012 | Kim ................... H02P 6/34 318/400.04 |
| 2014/0055064 | A1 | 2/2014 | Ng |
| 2014/0253002 | A1* | 9/2014 | Mikail ............... B62D 5/046 318/400.15 |
| 2017/0324364 | A1 | 11/2017 | Lu |
| 2018/0167011 | A1 | 6/2018 | Lu et al. |
| 2018/0212540 | A1* | 7/2018 | Shim ................ H02P 29/027 |
| 2019/0147323 | A1* | 5/2019 | Li ...................... G06N 3/063 706/15 |
| 2020/0021212 | A1 | 1/2020 | Yamada et al. |
| 2020/0028456 | A1* | 1/2020 | Morioka ............... H02P 6/20 |

OTHER PUBLICATIONS

U.S. Appl. No. 16/396,877, filed Apr. 29, 2019, Lu.
U.S. Appl. No. 16/819,765, filed Mar. 16, 2020, Lu.
Day et al., "Piecewise Linear Interpolation on PIC12/14/16 Series Microcontrollers;" Microchip Technology Inc., AN942; Last Updated Feb. 21, 2005; 8 Pages.
PCT International Search Report and Written Opinion dated Dec. 3, 2020 for International Application No. PCT/US2020/050053; 15 Pages.
Taiwan Office Action with the Search Report (with English Translation) dated Jun. 4, 2021 for Taiwan Application No. 109132354; 14 Pages.
Response (with English Translation) to Taiwan Office Action dated Jun. 4, 2021 for Taiwan Application No. 109132354; Response filed Sep. 6, 2021; 68 Pages.
European Communication Pursuant to Rules 161/162 dated Mar. 11, 2022 for European Application No. 20776030.7; 3 Pages.
PCT International Preliminary Report dated Apr. 7, 2022 for International Application No. PCT/US2020/050053; 8 Pages.
Taiwan Allowance Decision (with English Translation) dated Mar. 1, 2022 for Taiwan Application No. 109132354; 3 Pages.
Response to European Official Communication dated Mar. 11, 2022 for European Application No. 20776030.7; Response filed Sep. 14, 2022; 8 Pages.

* cited by examiner

| Address | Index | input data | output data |
|---|---|---|---|
| 32 | 0 | 0 | 0 |
| 33 | 1 | 100 | 0 |
| 34 | 2 | 80 | 100 |
| 35 | 3 | 200 | 100 |
| 36 | 4 | 180 | 200 |
| 37 | 5 | 300 | 200 |
| 38 | 6 | 280 | 400 |
| 39 | 7 | 400 | 400 |
| 40 | 8 | 380 | 511 |
| 41 | 9 | 511 | 511 |

| Address | Index | input data | output data |
|---|---|---|---|
| 32 | 0 | 0 | 0 |
| 33 | 1 | 100 | 0 |
| 34 | 2 | 80 | 100 |
| 35 | 3 | 400 | 511 |
| 36 | 4 | 505 | 511 |
| 37 | 5 | 500 | 0 |
| 38 | 6 | 511 | 0 |

BLDC MOTOR CONTROLLER/DRIVER

CROSS REFERENCE TO RELATED APPLICATIONS

The present application claims the benefit of U.S. Provisional Patent Application No. 62/905,659 filed on Sep. 25, 2019, which is incorporated herein by reference.

BACKGROUND

As in known in art, brushless DC (BLDC) motors can include an external electronic switch synchronized to the rotor position that replaces a mechanical commutator. In conventional BLDCs, Hall effect sensors may be mounted on the windings for rotor position sensing and closed-loop control of the electronic commutator.

SUMMARY

In one aspect, a method comprises: employing a curve transformer having an index value for each stored input value and output value for providing stored corner points for outputs of the curve transformer, wherein the curve transformer outputs interpolated data for input data between adjacent ones of the input values.

A method can further include one or more of the following features: the interpolated data comprises linear interpolated data, the curve transformer controls a three-phase motor, the curve transformer controls motor speed, the curve transformer for controls motor torque, the curve transformer controls motor power, the curve transformer controls motor control demand, the index values, the input values and the output values provide steps in the output of the curve transformer, the steps include hysteresis, the output of the curve transformer is not monotonic, and/or the curve transformer uses polar FOC in a motor controller IC package.

In another aspect, a motor controller IC package comprises: a processer and memory configured to provide: a curve transformer having an index value for each stored input value and output value for providing stored corner points for outputs of the curve transformer; wherein the curve transformer outputs interpolated data for input data between adjacent ones of the input values.

A motor controller IC package can further include one or more of the following features: the interpolated data comprises linear interpolated data, the curve transformer is configured to control a three-phase motor, the curve transformer is configured to control motor speed, the curve transformer is configured to control motor torque, the curve transformer is configured to control motor power, the curve transformer is configured to control motor control demand, the index values, the input values and the output values provide steps in the output of the curve transformer, the steps include hysteresis, the output of the curve transformer is not monotonic, and/or the curve transformer is configured for polar FOC motor control.

BRIEF DESCRIPTION OF THE DRAWINGS

The foregoing features of this invention, as well as the invention itself, may be more fully understood from the following description of the drawings in which.

DETAILED DESCRIPTION

Figure 1:
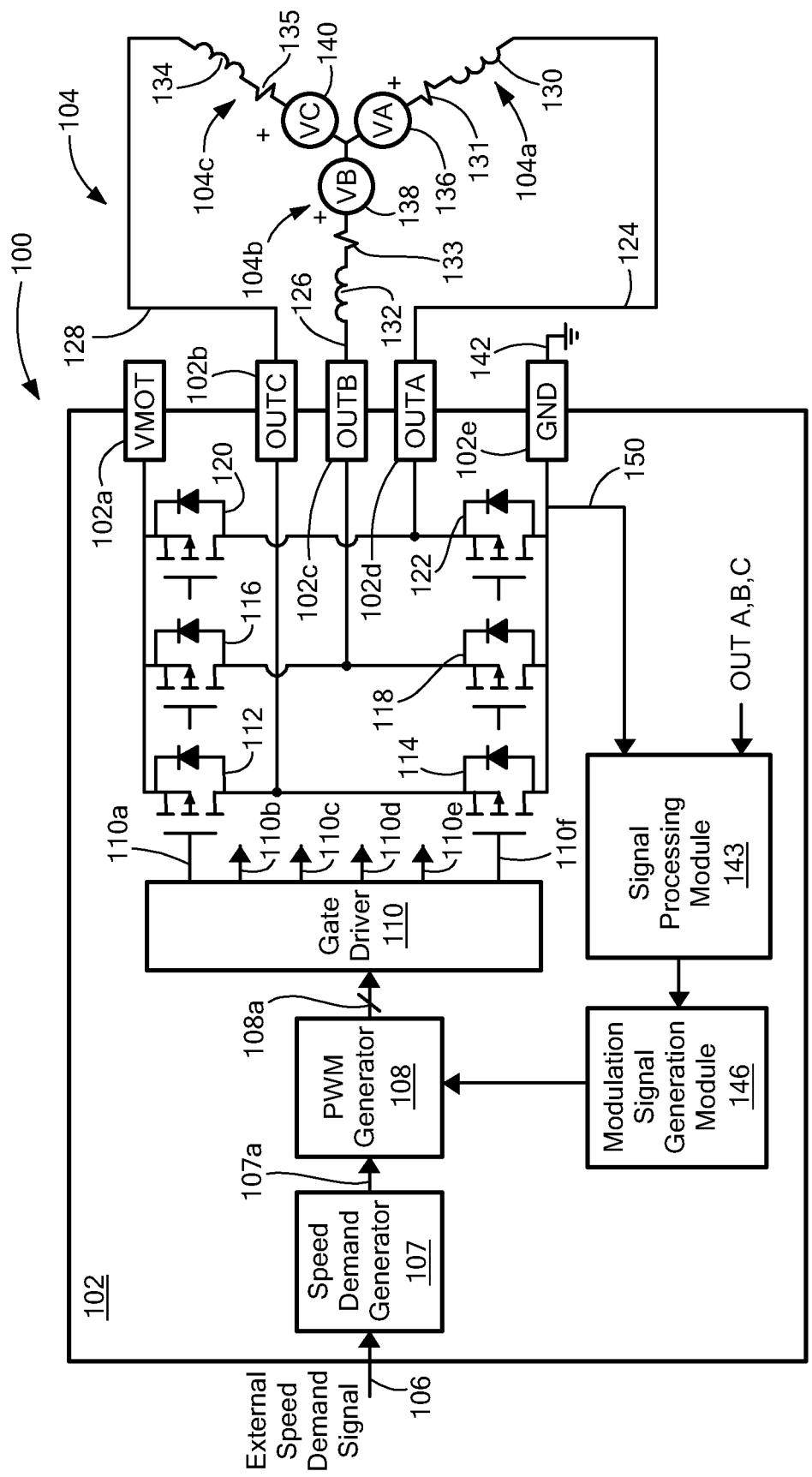
FIG. 1 is a schematic representation of an example control system for a three-phase BLDC motor in accordance with example embodiments of the invention.

FIG. 1 shows an example system 100 for controlling a motor in accordance with illustrative embodiments of the invention. The control system 100 may be useful for controlling three-phase BLDCs, for example. An exemplary motor control circuit 102 is coupled to drive an electric motor 104, which has three windings 104a, 104b, 104c, that can each be depicted as a respective equivalent circuit having an inductor in series with a resistor and in series with a back EMF voltage source. For example, the winding A 104a is shown to include an inductor 130 in series with a resistor 131 and in series with a back EMF voltage source VA 136. The voltage of the back EMF voltage source VA 136 is not directly observable when a current is flowing in an associated motor winding, but it can be estimated by looking at the phase current and phase voltage.

In general, the voltage across a motor winding, for example, across the winding A 140*a*, is governed by the following equation:

$$VoutA - Vcommon = VA + IR + LdI/dt,$$

where:
VoutA=observable voltage at one end of the winding A;
Vcommon=(VoutA+VoutB+VoutC)/3 voltage at junction of the windings 104*a*, 104*b*, 104*c*; and can be calculated by VoutA, VoutB and VoutC.
R=resistance of the resistor 131;
L=inductance of inductor 130;
I=current through winding; and
VA=back EMF voltage Thus, it can be seen that, if the current through the winding 104*a* is zero, then VoutA−Vcommon=VA+LdI/dt. The ideal case is VoutA−Vcommon=LdI/dt, so that the back-EMF VA is in phase with the phase current.

In the illustrated embodiment, the motor control circuit 102 includes a speed demand generator 107 coupled to receive an external speed demand signal 106 from outside of the motor control circuit 102. The external speed demand signal 106 can be provided in a variety of formats. In general, the external speed demand signal 106 is indicative of a speed of the motor 104 that is requested from outside of the motor control circuit 102.

In embodiments, the speed demand signal 107*a* is determined not only by the external speed demand signal, but also the motor current requirement measured or calculated in signal processing module. If the event of over current limit (OCL) happens, the speed demand signal 107*a* will be clamped and might be less than the external speed demand signal 106.

The speed demand generator 107 is configured to generate a speed demand signal 107*a*. A pulse width modulation (PWM) generator 108 is coupled to receive the speed demand signal 107*a* and configured to generate PWM signals 108*a*, a duty cycle of which is controlled by the speed demand signal 107*a*. The PWM generator 108 is also coupled to receive modulation waveforms from a modulation signal generation module 146. The PWM signals 108*a* are generated with a modulation characteristic (i.e., a relative time-varying duty cycle) in accordance with the modulation waveforms from the modulation signal generation module 146.

In one embodiment, the motor control circuit 102 also includes a gate driver circuit 110 coupled to receive the PWM signals 108*a* and configured to generate PWM gate drive signals 110*a*, 110*b*, 110*c*, 110*d*, 110*e*, 110*f* to drive six transistors 112, 114, 116, 118, 120, 122 arranged as three half-bridge circuits 112/114, 116/118, 120/122. The six transistors 112, 114, 116, 118, 120, 122 may operate in saturation to provide three motor drive signals VoutA, VoutB, VoutC, 124, 126, 128, respectively, at nodes 102*d*, 102*c*, 102*b*, respectively.

It is understood that any practical number of switching elements coupled in various suitable configurations can be used to meet the needs of a particular application. It is further understood that any suitable signal generator can be used to generate control signals for the switching elements that provide signals to energize the three-phase BLDC motor.

The motor control circuit 102 can also include a signal processing module 143 to receive a bus current measurement signal 150 and one or more of the motor drive signals VoutA, VoutB, VoutC, 124, 126, 128, respectively. In embodiments, these signals can be used for phase A, B, and/or C phase zero current detection (ZCD). The bus current 150 and motor drive signals VoutA,B,C can be used to control motor speed, as discussed more fully below.

The control circuit 102 can be coupled to receive a motor voltage VMOT, or simply VM, at a node 102*a*, which is supplied to the motor through the transistors 112, 116, 120 during times when the upper transistors 112, 116, 120 are turned on. It will be understood that there can be a small voltage drop (for example, 0.1 volts) through the transistors 112, 116, 120 when they are turned on and supplying current to the motor 104.

Figure 2:
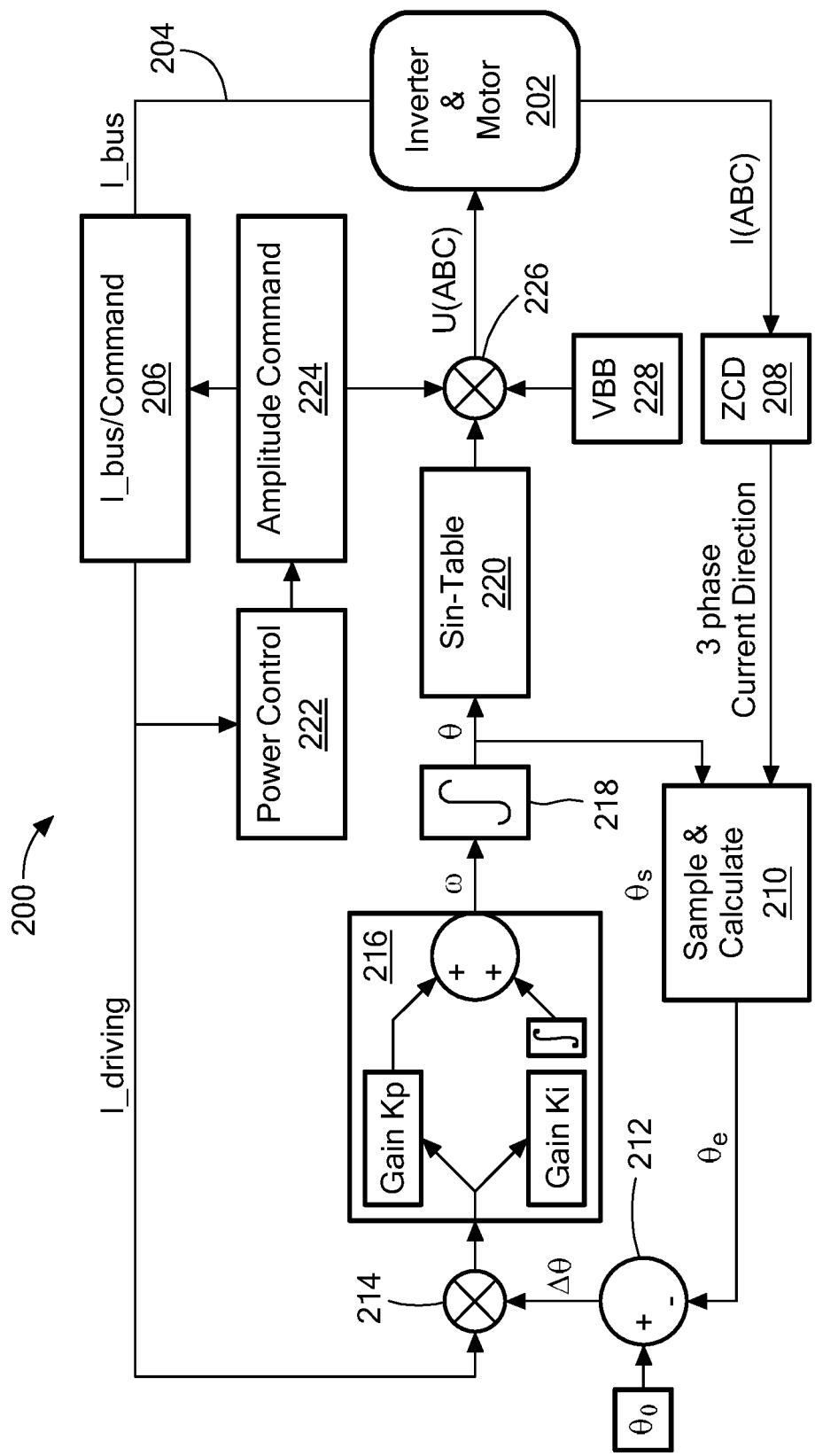
FIG. 2 is a schematic representation showing further detail of the example control system of FIG. 1.

FIG. 2 shows a BLDC control system 200 in accordance with example embodiments of the invention showing further detail for the system of FIG. 1. An inverter/motor module 202 receives control signals U(ABC) to control the three-phase motor. The inverter/motor module 202 generates an I_bus signal 204 corresponding to bus current to an I_bus command module 206 and phase current signals I(ABC) to a zero current detection module 208, which provides three-phase current direction information to a sample/calculate module 210. The I_bus/command (e.g., I_bus divided by speed command) module 206 generates an I_driving signal or driving current, as described more fully below.

The sample/calculate module 210 receives a motor driving angle signal θ, which can be sampled as θs when zero current is detected, and outputs difference angle θe, which corresponds to the difference between the motor phase current and phase voltage, as described more fully below. A phase advance angle θ0, which can be provided as an input signal, can be input to a summer 212, which outputs a difference angle Δθ for adjusting the speed ω of the motor. In an embodiment, the difference angle Δθ and an I_driving signal (driving current) generated by the I_bus/command module 206 are provided as inputs to a combiner 214, e.g., a multiplier, the output of which is provided to a proportional-integral-derivative (PID) controller 216. The PID 216 generates an output value co for motor speed as the difference between the θe and 00 attempts to minimize the motor speed error over time. The PID 216 output is integrated 218 and provided to a conversion mechanism 220, e.g., a look-up table, for controlling the motor, as well as to the sample/calculator module 210 to enable sampling θs of motor speed angle signal θ.

It is understood that Kp and Ki represent coefficients for the proportional and integral derivative terms. A derivative coefficient Kd can also be used. P accounts for present values of the error between θe and θ0, I accounts for past values of the error, and D accounts for possible future values of the error, based on a current rate of change. By tuning the coefficients, the PID controller 216 can perform in accordance with specific process requirements The I_bus command module 206 I_driving output signal is provided to a power control module 222, which provides an output to an amplitude command module 224. A combiner 226 receives an output from the amplitude command module 224, the conversion mechanism 220, and a signal 228, such as VBB which can correspond to the motor voltage VM. The combiner 226 output is provided to the inverter/motor module 202 to generate gate signals for the switching elements and thereby control the speed of the motor. In example embodiments, the combiner 226 multiples input signals to generate the output.

Figure 2A:
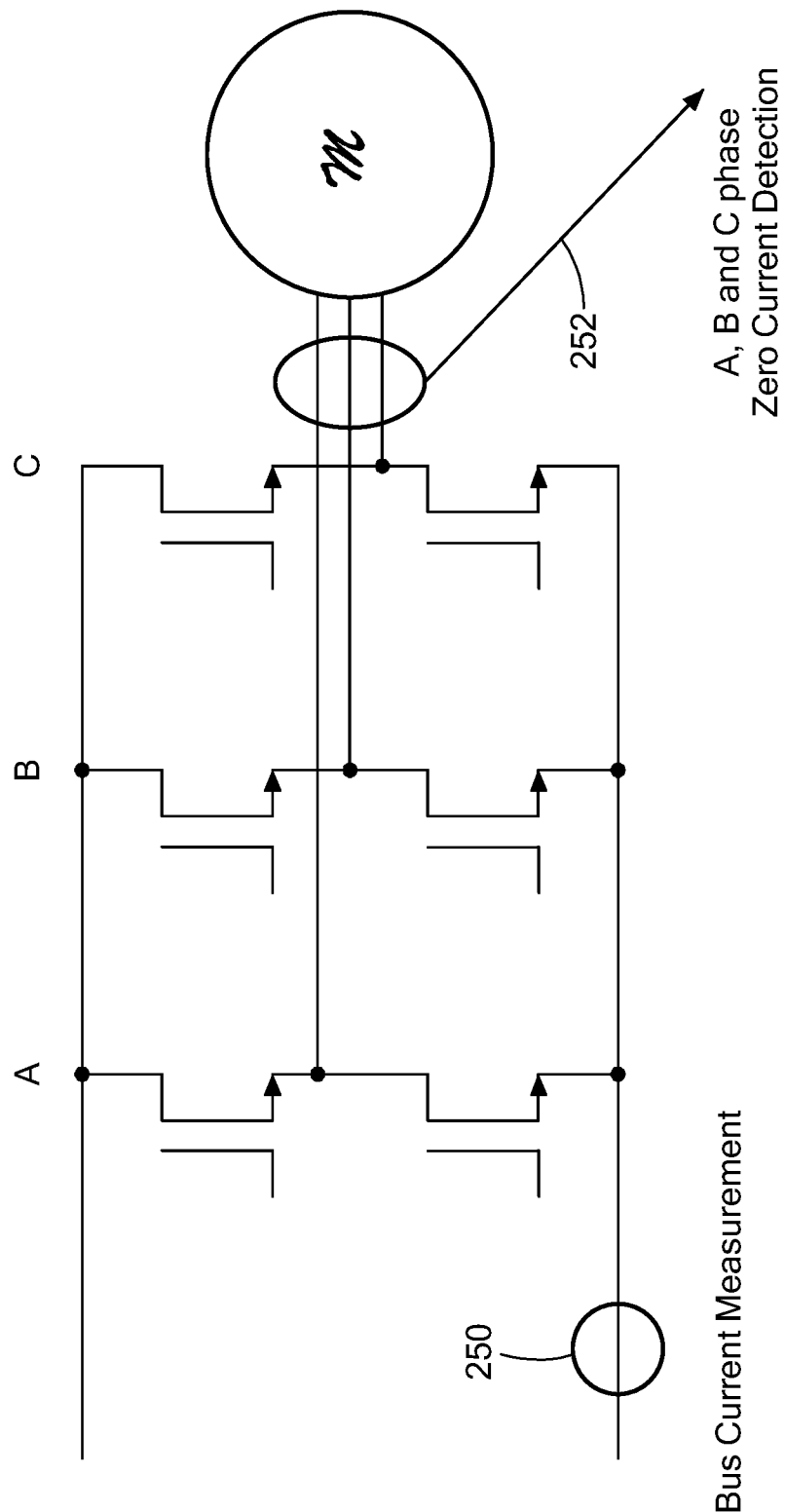
FIG. 2A is a schematic representation showing example bus current measurement and phase zero current detection.

FIG. 2A shows one embodiment of illustrative locations to measure the bus current 250 and phase A, B, C zero current detection 252. In embodiments, first, second, and third switching device pairs are each coupled to a respective phase A, B, C of the motor M. The sensed signals enable phase A, B, C zero current detection.

Figure 3:
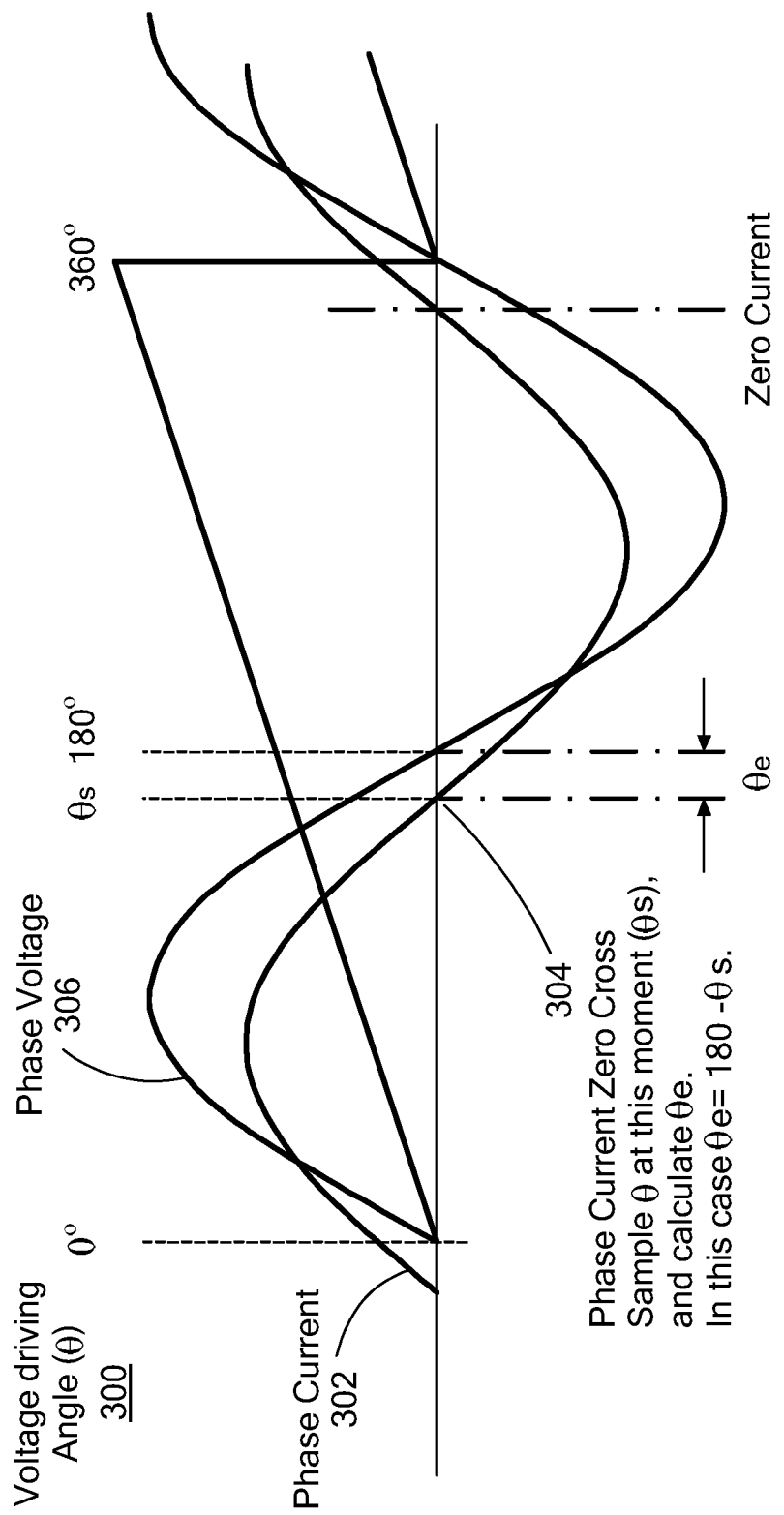
FIG. 3 is a graphical representation of illustrative phase current and phase voltage waveforms for a BLDC motor.

FIG. 3 shows illustrative waveforms that can be used for BLDC motor control in accordance with example embodiments of the invention. A voltage driving angle 300 for a three phase BLDC is shown from 0 to 360 degrees. A sinusoidal phase current signal 302 is shown having a falling zero crossing 304 that corresponds to the sampled voltage driving angle θs, which can be used to derive the angle θe between the phase current 302 and a phase voltage 306. In the illustrated embodiment, θe=180−θs.

Figure 3A:
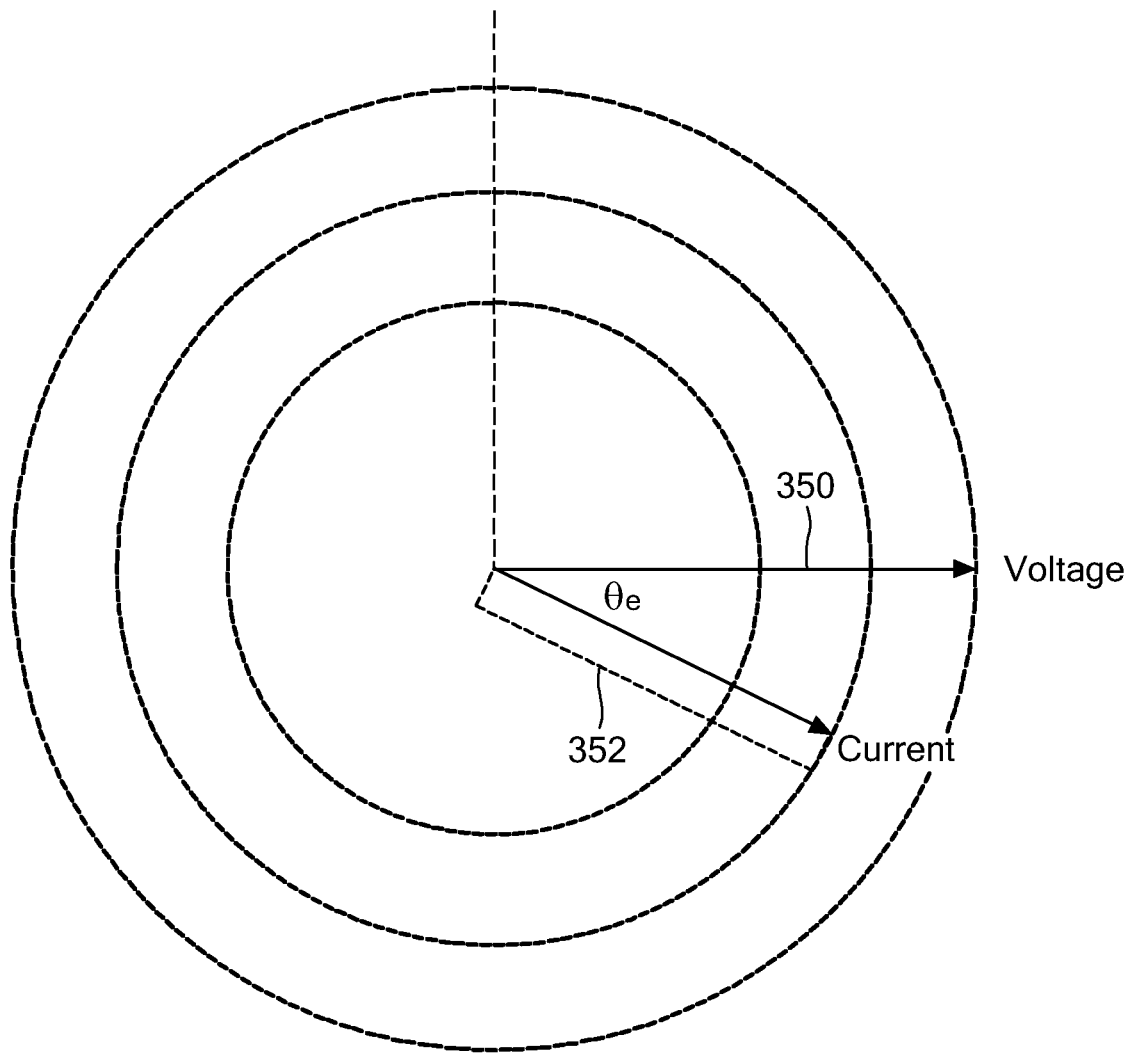
FIG. 3A is a polar coordinate representation of phase voltage and driving current.

In embodiments, difference angle θe should be equal to θ0 (FIG. 2) at steady state conditions. FIG. 3A shows angle θe in a polar coordinate system defined by angle between phase voltage 350 and the driving current 352 (FIG. 2 output from 206).

Figure 4:
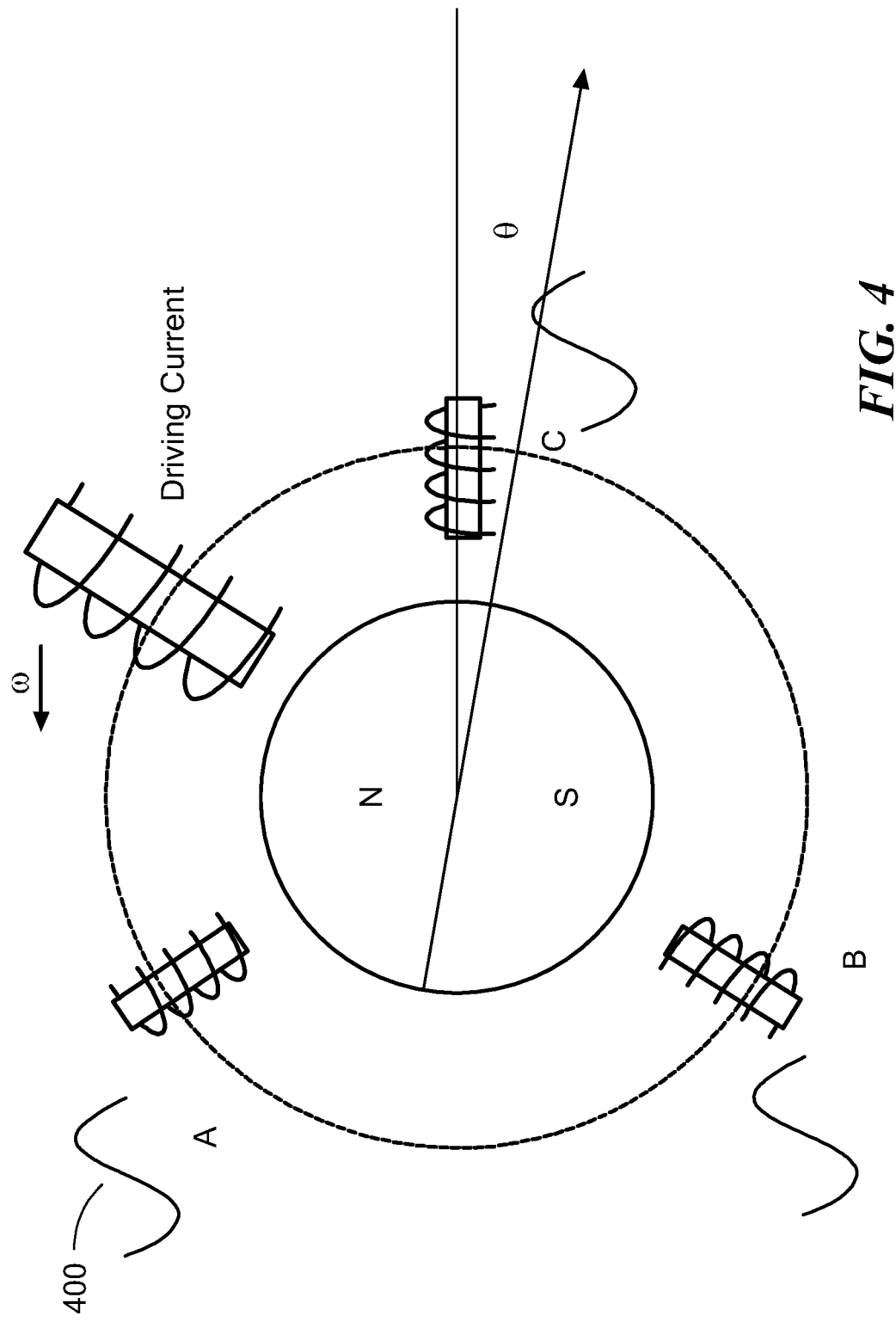
FIG. 4 is a schematic representation of driving current as a rotational DC current derived from three-phase AC currents.

FIG. 4 shows a representation of driving current for which three-phase AC currents can be replaced with an equivalent rotational DC current. As can be see, a sinusoidal current can be supplied to each of phase A, B, C of a motor. A magnet includes a north N pole and a south S pole from which position is determined. Angle θ refers to the voltage driving angle, which is the input of the sinusoidal function of the phase voltage. In embodiments, the angle θ can provide an index of the sinusoidal look up table.

As noted above, the I_bus/command module 206 (FIG. 2) can generate the I_driving signal for the PID controller 216. In example embodiments, the I_driving=I_bus divided by the speed command. The relationship between the I_driving and the phase current is described below:

The three phase currents can be defined as:

$IA = I\text{peak}*\sin(\omega t)$, where ω corresponds to motor speed $IB = I\text{peak}*\sin(\omega t - 120°)$ $IB = I\text{peak}*\sin(\omega t - 240°)$, The phase torques can be defined as:

$TA = IA*\text{FluxPeak}*\sin(\theta + 120°)$ $TB = IB*\text{FluxPeak}*\sin(\theta + 240°)$ $TC = IC*\text{FluxPeak}*\sin(\theta + 0°)$ $T\text{sum} = 1.5*I\text{peak}*\text{FluxPeak}*(\omega t + \theta + 120°)$ For a DC driving current Idrive=1.5*Ipeak, which rotates with speed ω counterclockwise, then Tdrive=1.5*Ipeak*FluxPeak*(ωt+θ+120°)=Tsum It can be seen that, by applying Idrive, which is 1.5 times of the Ipeak DC current, rotated together with the magnet of the BLDC, the BLDC motor is driven by the equivalent torque Tdrive=Tsum. So, for analysis, the 3 phase current IA, IB and IC are replaced by Idrive. Idriving is the amplitude of Idrive, and can be measured by the I_bus/command module 206 (FIG. 2).

Figure 5:
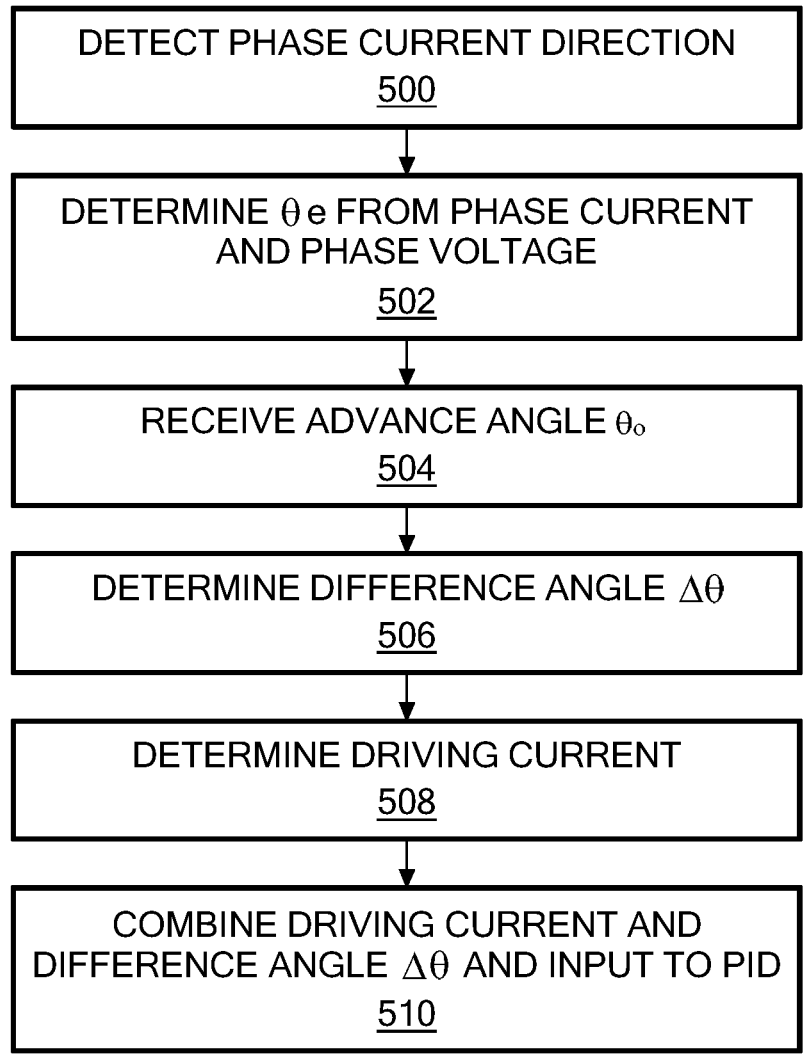
FIG. 5 is an illustrative process for controlling speed of a three-phase BLDC motor in accordance with example embodiments of the invention.

FIG. 5 shows an example process for BLDC motor control in accordance with illustrative embodiments of the invention. In step 500, phase current direction can be detected using a suitable zero current detection (ZCD) technique, such as that shown and described in U.S. Pat. No. 8,917,043, which is incorporated herein by reference. In step 502, an angle θe between phase current 302 (see, e.g., FIG. 3) and phase voltage 306 can be calculated from the sampled voltage driving angle θs when zero current is detected. The voltage driving angle θ can be an index from 0 to 360 degree, which determines the sinusoidal wave output. The angle θe can correspond to the angular position of the current in the polar coordinate system, as shown in FIG. 3A. In step 504, a phase advance angle $\theta_0$ is received as an input, calculated from motor inductance, or the like. In general, the angle θe should be equal to $\theta_0$ at steady state. In step 506, the difference angle Δθ (e.g., θ0−θe) provides a feedback signal to the control loop, e.g., PID controller 216 (FIG. 2) for adjusting motor speed ω.

In step 508, the system (e.g., I_bus/command module 206 FIG. 2) measures the average value of the bus current 204 (FIG. 2 and FIG. 4) and converts this value to the driving current (I_driving), which is the effective rotational current that creates the driving torque for the motor. It is understood that any suitable method to measure and/or estimate the driving current can be used.

In the three-phase BLDC motor driven by sinusoidal waveform, as noted above, the three phase AC currents can be replaced with an equivalent rotational DC current that can be referred to as the driving current, which is proportional to the bus current divided by the amplitude command. In one embodiment, I_driving=thus*1.732/amplitude_command. The driving current is the radial portion 352 in the polar coordinate system of FIG. 3A.

In step 510, the driving current is multiplied by the difference angle Δθ and the product is fed into a PI controller 216 (FIG. 2). The proportional gain (Kp) and the integral gain (Ki) of the PI control loop can be determined by motor parameters, for example. The driving current can also be used for power control which controls the system acceleration and deceleration.

In another aspect, BLDC motor control processing can include a data curve transformer that can be useful for speed, torque, power, control demand data, and the like. In embodiments, a curve transformer can be provided as part of a signal processor, such as the signal processing module 143 of FIG. 1.

Figure 6:
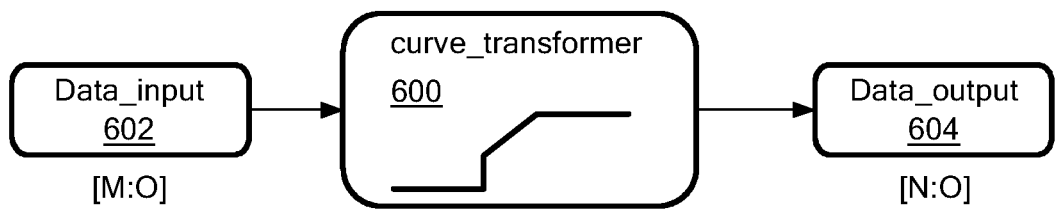
FIG. 6 is a schematic representation of a schematic of a curve transformer.

FIG. 6 shows an example curve transformer module 600 having M (M:0) input bits and N (N:0) output bits. In example embodiments, N=M so that the number of input bits and output bits is the same. It is understood that N and M can be provided as any practical integer to meet the needs of a particular application.

Figure 7B:
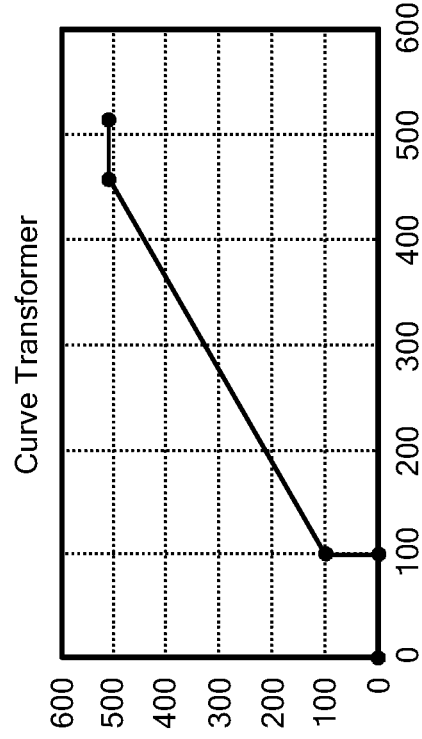
FIG. 7B is another example implementation of a curve transformer.
Figure 7A:
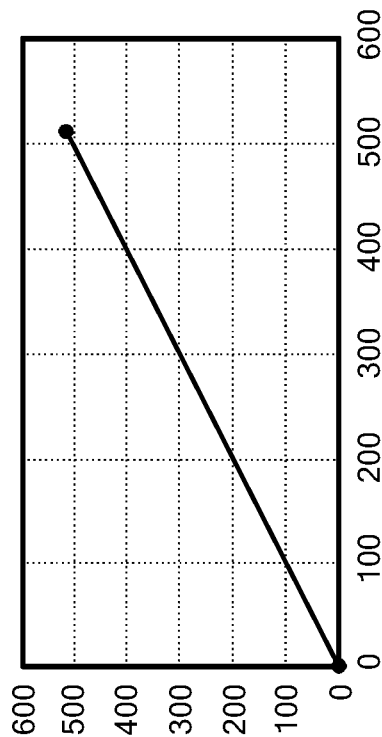
FIG. 7A is an example implementation of a curve transformer.

FIG. 7A shows an example implementation in which N=M=9 where input and output data values can range from 0 to 511. The curve transformer 600 (FIG. 6) converts an input data value to an output data value. In the illustrated embodiment, each input data value, which is between 0 and 511 is converted to an output value, which is between 0 and 511. In some embodiments, data look up values can be stored in EEPROM or other storage. The 0 and 511 'corner points' are stored and values in between are calculated by linear interpolation, for example. It is understood that any suitable interpolation technique can be used to meet the needs of a particular application. Transform data can be stored in a particular memory address to cover some number of corner points. In one particular embodiment, each data point contains 9 bit input data and 9 bit output data.

In the illustrated embodiment of FIG. 7A, address 32 stores the first point (index 0), input data is 0, output data is 0, and address 33 stores the second point (index 1), input data is 511, output data is 511. The curve is a linear curve from 0 to 511. In the second row, the input data is 511 which indicates the last corner point of the curve. In embodiments, data beyond this row is ignored.

FIG. 7B shows a further example of input data {0, 100, 100, 450, 511} transformed to output data {0, 0, 100, 511, 511} using index values {0, 1, 2, 3, 4} in address locations {32, 33, 34, 35, 36} in memory. The input and output values are shown in the curve on the right side of the figure. Corner points are shown with a linear extrapolation from 100 to 511. Input data below 100 will be converted to a 0 output value. Input data above 450 will be converted to an output value of 511.

In an example speed demand implementation using a curve transformer, a motor will not start with less than about 20% (100/511) of speed demand and motor speed will be saturated if the input demand is higher than about 80% (450/511).

Figure 7C:
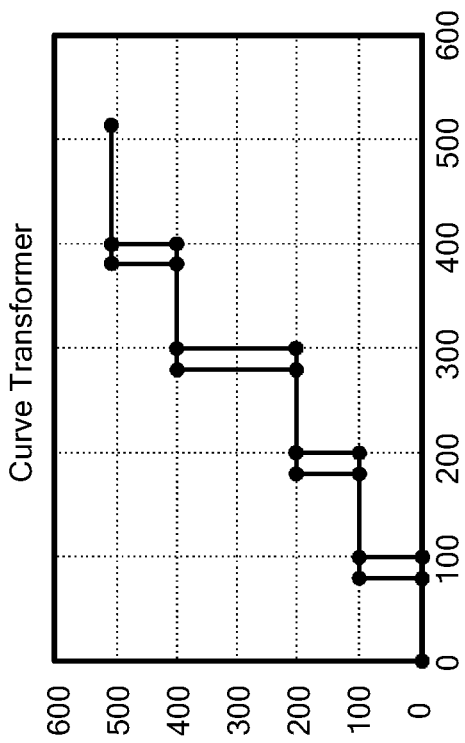
FIG. 7C is another example implementation of a curve transformer.

FIG. 7C shows another example using ten points to provide a step curve with hysteresis. As can be seen, various input data values correspond to output data values that form a plateau for a specified range of input values. If the input data of the next point (index N+1) is less than the input data of the current point (index N), there will be a hysteresis. For example, index 1 is 100, and index 2 is 80, which generates a hysteresis of 20. Similar hysteresis is provided in index 3 and 4, index 5 and 6, and index 7 and 8.

Figure 7D:
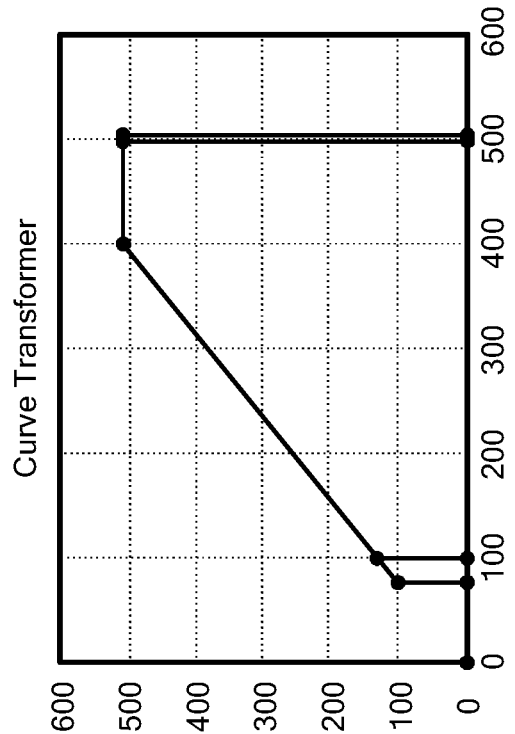
FIG. 7D is another example implementation of a curve transformer.

FIG. 7D shows another example in which the output does not need to be monotonic, as in this example in which the output goes back to zero when the input is 511 for index 6. In the illustrated embodiment, the curve has linear extrapolation from 80 to 511 and various corner points.

Figure 7E:
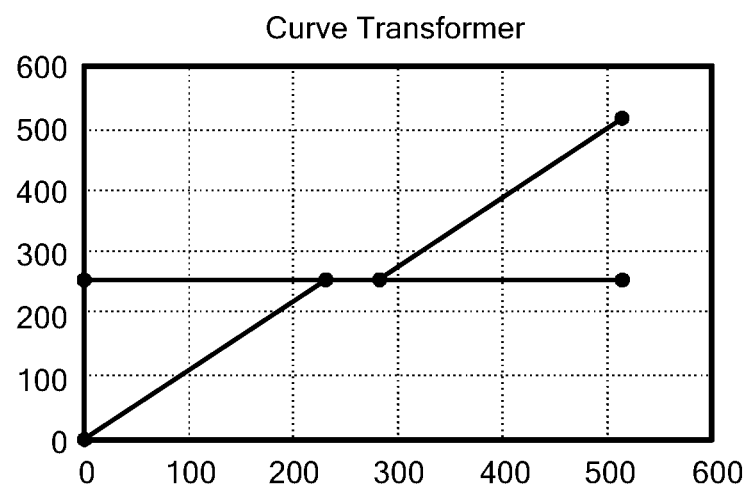
FIG. 7E is another example implementation of a curve transformer.

FIG. 7E shows another example with a curve that can be considered bi-directional in motor applications. In the illustrated example, for input demand between 230 and 280, the output is 255. If the bi-directional curve is selected, this translates to zero speed. An input demand of 0 means the maximum speed in the reverse direction, and the input demand of 511 also translates to maximum speed but in the forward direction. As can be seen the curve is linear between 0 and 230 and from 280 to 511.

As shown and described above, example embodiments include polar field oriented control (FOC) for BLDC motors where processing is performed in the polar coordinate domain. Referring again to FIGS. 1, 2, and 3 for any vector in the BLDC motor control system, the voltage, the current, and the back BEMF can be characterized by the direct axis factor and quadrature axis factor. It can also be characterized by the amplitude and the angle, which structure is called polar coordinate. The amplitude of the current can be measured from the bus current, and the angle measured by ZCD (zero current cross detect) circuitry (see, e.g., FIG. 3).

When the phase current crosses zero, the circuitry can sample the pointer value which is the angle theta that generates the three-phase voltage output. Note that if the current cross is a falling edge, the sampled theta (theta_s), should subtract 180 degree to get the error angle (theta_e). Also note there are three phase currents so that if the zero current occurs in phase B or C, 120 or 240 degree need to be added.

Referring again to FIG. 4, the current going through the motor winding is referred to as the phase current, and the current going through the power supply is called the bus current. Phase current is a sinusoidal waveform, and bus current is ripple waveform with average DC value if I_bus. In example embodiments, the driving current (or I_drive) refers to the equivalent DC rotational current. The wire carrying the driving current rotates synchronously with the motor magnet which is based on the same torque effect.

In embodiments, the driving current has the amplitude of 1.5 time of the peak of the phase current. An example motor driver controller IC package will only measure the bus current and calculate the driving current as follows:

$$Idrive=Ibus*1.732/amplitudeCmd/\cos(\text{theta}).$$

Because the theta is usually a relatively small angle, and cos(theta) is approximately equal to 1, one can ignore the cos(theta) factor in above equation. In other embodiments, cos(theta) is not ignored.

Referring again to FIG. 2, current zero crossing is detected by the ZCD circuit 208, the sample and calculate block 210 generates the angle between voltage and current (theta_e). Theta_0 is calculated based on the motor inductance, current, and motor speed (w I L). Higher current, higher speed and higher inductance may require a higher theta_0. In some embodiments, a user can program the theta_0 directly.

In embodiments, it is desirable to control the difference of theta_e and theta_0 which is the feedback that should be zero. Going through the PID module 216, the output adjusts the driving speed. The motor physical speed is determined by the driving torque, the load torque and the inertia. The driving speed should be equal to motor speed in steady state. If driving speed is higher or lower than the motor speed for a certain time, the motor will go 'out of phase', and the control loop may fail. So the driving speed should be adjusted continuously based on the feedback of the theta.

Bus current can be measured by an op-amp and an ADC in the I_bus/command module 206. I_bus divided by the amplitude command can generate the I_drive (ignoring the cos theta). The I_drive signal may be limited between the rated current and zero by regulating the amplitude command 224, which may also affect the I_drive calculation.

In embodiments, the I_drive signal multiplies the delta theta into 214 before feeding into the PID module 216. With higher current (I_drive), a small angle error (delta theta) may require higher adjustment. Driving speed may be integrated to generate the pointer (theta), and the sin table may read the pointer to generate the 3 phase output voltage.

As described above, in some embodiments, the bus current is divided by duty cycle (bus current/duty) to represent the phase current (peak value), which assumes that phase current and phase voltage has a small angle, e.g. cos(θ)=1. In some embodiments, θ can be relatively large, such as 30 degrees, so cos(θ) may be involved in the calculation.

Figure 8A:
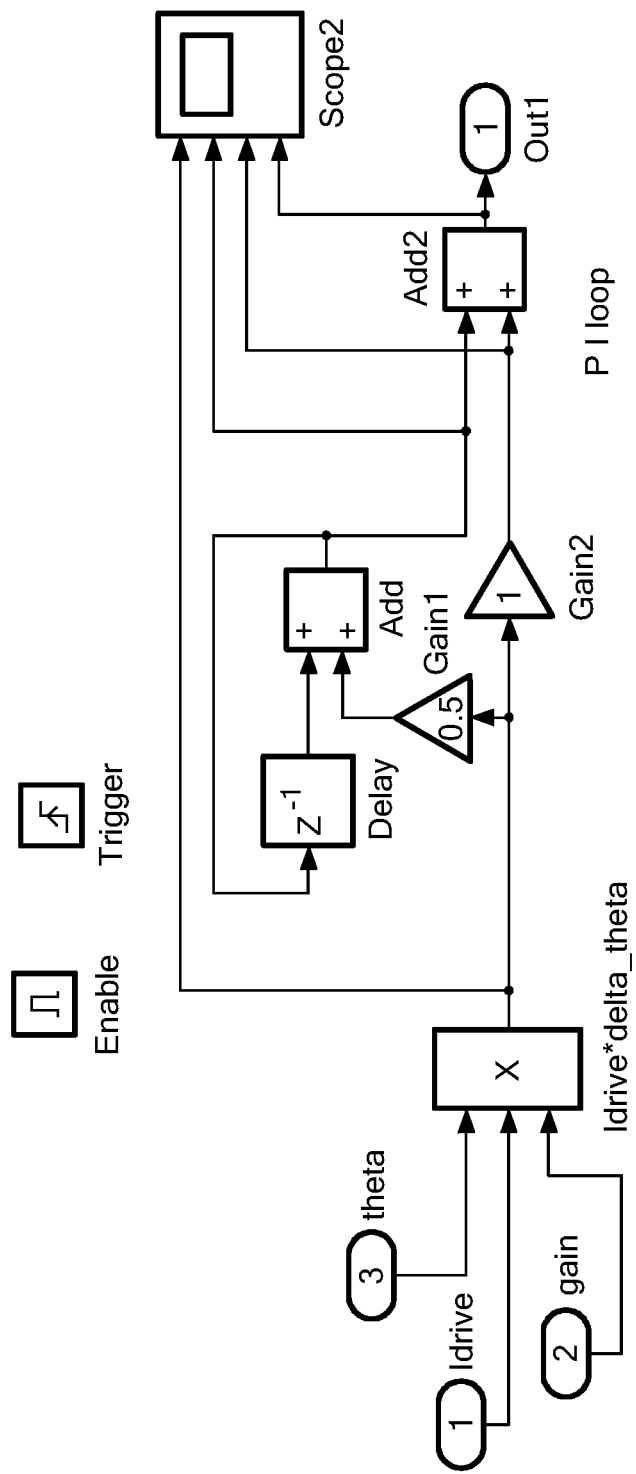
FIG. 8A is a schematic representation of a PI loop embodiment.
Figure 8B:
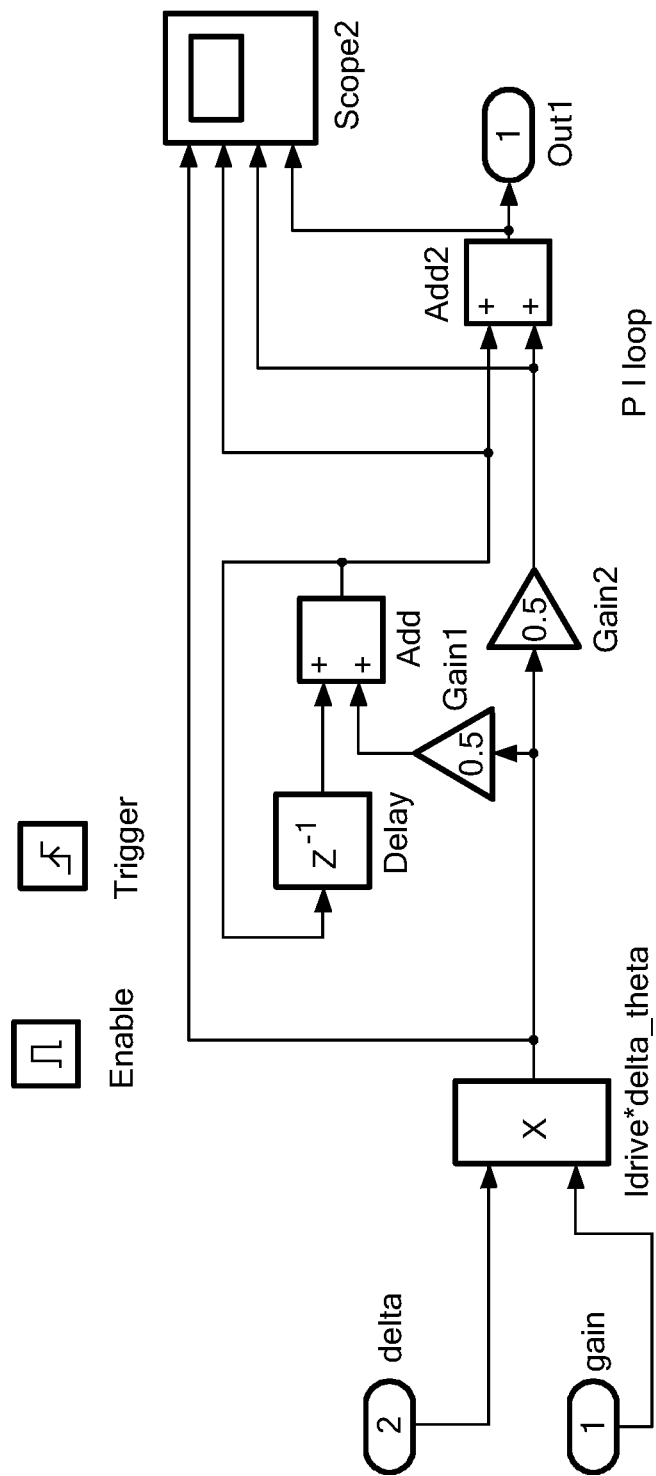
FIG. 8B is a schematic representation of another PI loop embodiment.

In some embodiments, the Idrive current, the gain, and the delta theta are multiplied together and provided to the integral proportional loop, as shown in FIG. 8A. In other embodiments, only the gain and the delta theta are multiplied together and provided to the integral proportional loop, as shown in FIG. 8B.

Figure 9A:
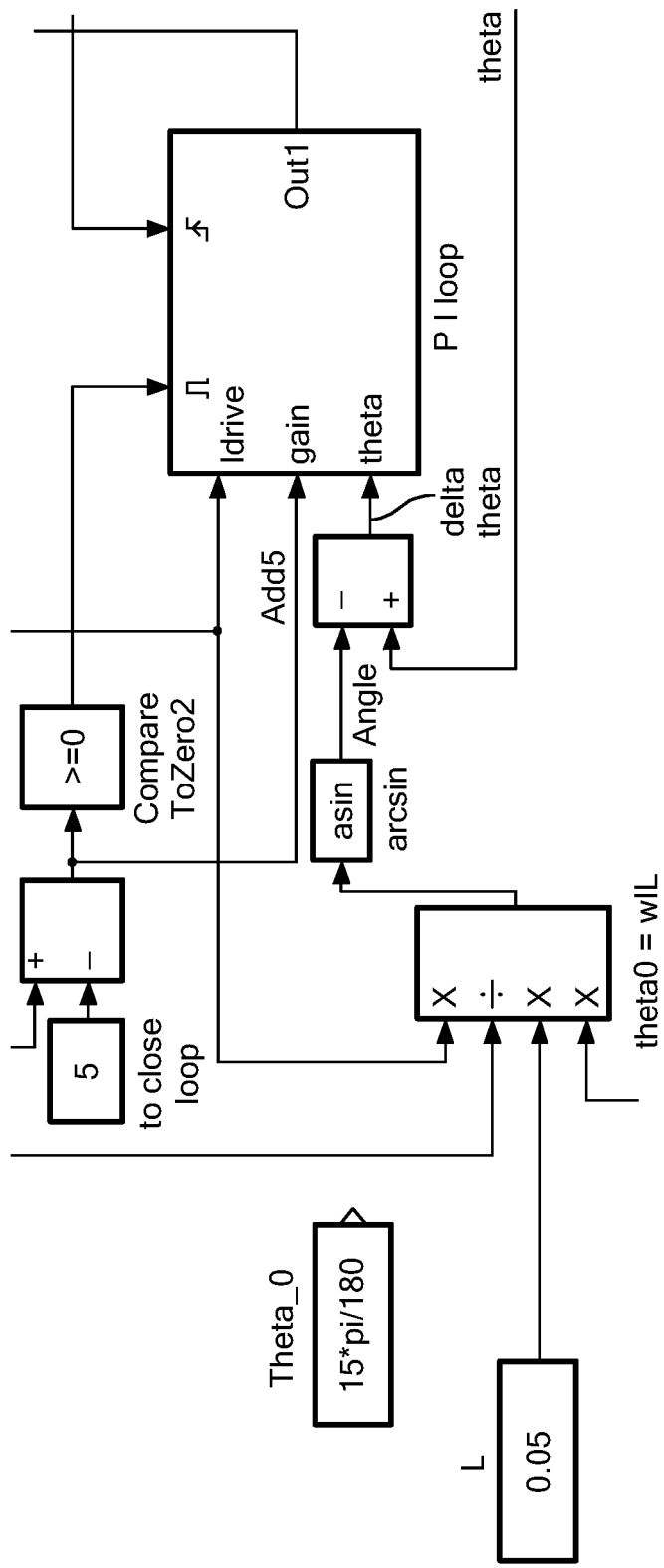
FIG. 9A is a schematic representation of an example error feedback loop.
Figure 9B:
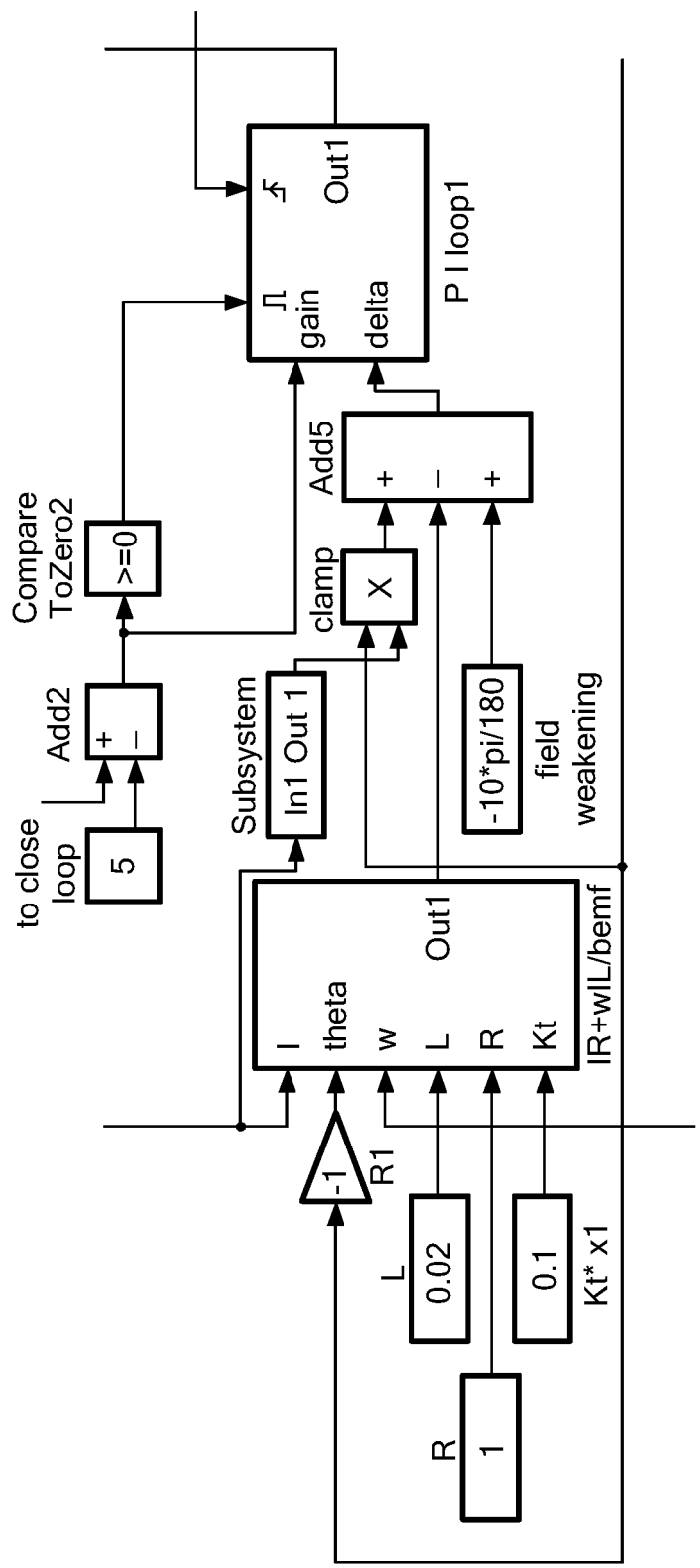
FIG. 9B is a schematic representation of another example error feedback loop.

In some embodiments, the feedback loop contains delta theta, which is the error between theta and theta 0, and Idrive, as shown in FIG. 9A. Theta 0 is calculated by w*I*L. In other embodiments, a block "IR+wIL/BEMF" can be implemented for these calculations. In some embodiments, a field weakening input can be added into the calculations.

In one example embodiment, a IR+wIL/BEMF block can be implemented as:

$$\text{error}=(\cos(\text{theta})*w*L+\sin(\text{theta})*w*Idrive*R)/(w*Kt)$$

$$\text{error}=(\cos(\text{theta})*w*L*Idrive+\sin(\text{theta})*Idrive*R)/(w*Kt)$$

where theta refers to the Phase current angle, w refers to Motor driving angle velocity [rad/s], Idrive refers to the Phase peak current[A], R refers to the Winding resistance

[ohm], L refers to Winding inductance [H], Kt refers to Motor Torque constant [Nm/A], and error refers to Phase Advance[rad]

Figure 10:
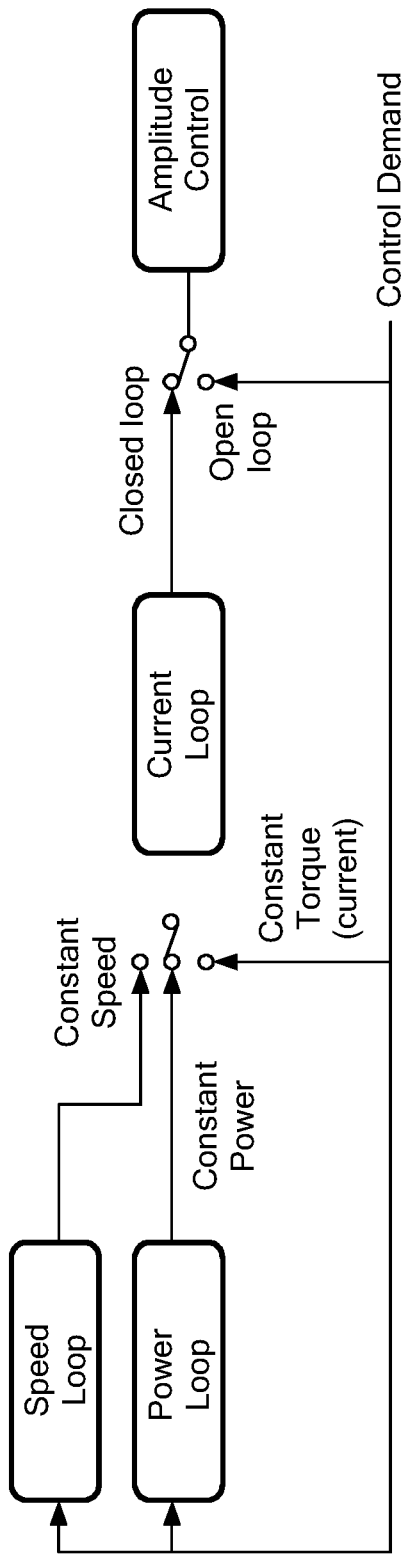
FIG. 10 is a block diagram of a control loop for operation.

In example embodiments, a motor controller has four modes of operation: open loop, constant speed, constant current (torque), and constant power. The three operational modes constant speed, constant current (torque) and constant power are closed loop modes. FIG. 10 shows an example control loop having speed loop, power loop, current loop, and amplitude control with the various modes of operation.

The driving torque of a BLDC motor is generated by the driving current (phase current) attracted by the permanent magnet. Controlling constant torque is equal to controlling constant current. The name constant torque and constant current may be used interchangeably. The control demand, which is either from the analog input, the PWM input or the i2c input, is applied to the four different blocks depends on the operation mode selection.

If the open loop is selected, the control demand will be applied to the amplitude control directly, higher control demand will cause higher average output voltage amplitude and most of the time will increase the current and motor speed. The current loop, speed loop and the power loop are not active in the open loop mode.

If the constant torque mode is selected, the control demand is applied to the reference input of the current loop. The speed loop and the power loop are bypassed. If the motor operation current (I_drive) is less than the torque demand, which is the control demand signal from either analog, PWM or I2C, the PI loop will increase the amplitude demand, and regulate the I_drive eventually. The time constant of the current loop is about 1 ms in example embodiments. Adjusting the integral and proportional parameters keeps the current loop stable. It will be appreciated that higher inductance motors require slower PI parameters.

If the constant speed mode is selected, the control demand is applied to the reference input of the speed loop. The power loop is bypassed. The current loop is operated after the speed loop. If the motor operation speed is less than the speed demand, which is the control demand signal from either analog, PWM, I2C, or the CLOCK (frequency) mode input, the PI loop will increase the current reference. Because the current loop is at least 10 time faster than the speed loop, the current can be treated as adjusting the target immediately where system regulates the motor speed eventually. The time constant of the speed loop is longer than 10 ms in example embodiments. Adjusting the integral and proportional parameters keeps the speed loop stable.

If the constant power mode is selected, the control demand is applied to the reference input of the power loop. The speed loop is bypassed. The current loop is operated after the power loop. If the motor operation power is less than the power demand, which is the control demand signal from either analog, PWM, or I2C input, the PI loop will increase the current reference. Because the current loop is at least 10 time faster than the power loop, the current can be treated as adjusted to the target immediately, system regulates the supply power eventually. The time constant of the power loop is longer than 10 ms, for example.

In embodiments, the rated speed and rated current can be programmed independently regardless of which operation mode is selected; they are mainly used to determine the motor parameters. The rated current can be used clamp the current reference signal from the speed loop or power loop.

In another aspect, embodiments of a motor controller have a phase-locked loop scheme for increased accuracy. A motor controller IC package may have an internal RC oscillator with a given accuracy/error, such as +−3%. In some applications, an external crystal accurate clock reference can be received. The motor controller can take the accurate clock reference and lock the internal PLL frequency to the accurate clock.

Figure 11:
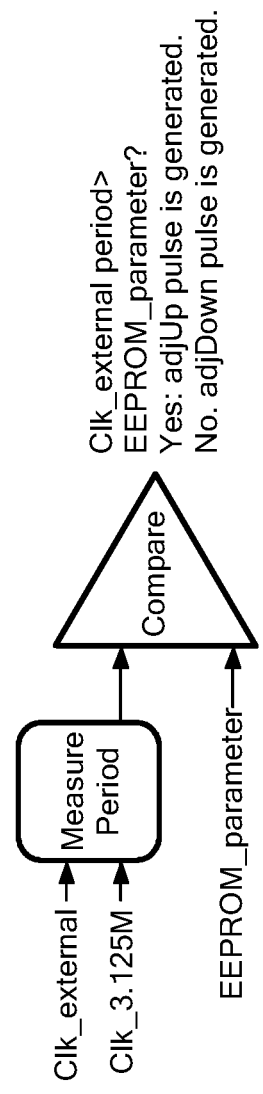
FIG. 11 is a schematic representation of an example PLL implementation.

FIG. 11 shows an example implementation in which a 16-bit EEPROM is used to program the clock frequency. The value in the EEPROM (N), multiplied by 320 ns, is the input clock period. For example, input clock frequency is 1 kHz, which has a 1 ms period. So, N=1 ms/320 ns=3125. We should program 3125 in the EEPROM.

The external clock can be fed in from any suitable source, such as a PWM pin, a DIR pin, a BRAKE pin, etc. The external clock is measured by the 3.125 M internal clock, and if the internal clock is accurate, the measured period should be equal to the EEPROM parameter. If the internal clock is slower, the measured period will be less than the EEPRM parameter, so the internal oscillator should run faster, then adjUp pulse is generated. If the internal clock is faster, the measured period will be higher than the EEPROM parameter, so the internal oscillator should run slower, then adjDown pulse is generated. If the error is more than 6.25%, either higher than reference by 6.25% or lower than 6.25%, it is treated as an invalid adjustment requirement. Neither adjUp or adjDown will be generated. If the function is not enabled, adjUp and adjDown will be zero, and adj_none will be 1. The adjUp, adjDown and adj_none signal will control the analog circuit to adjust the oscillator frequency.

Figure 12:
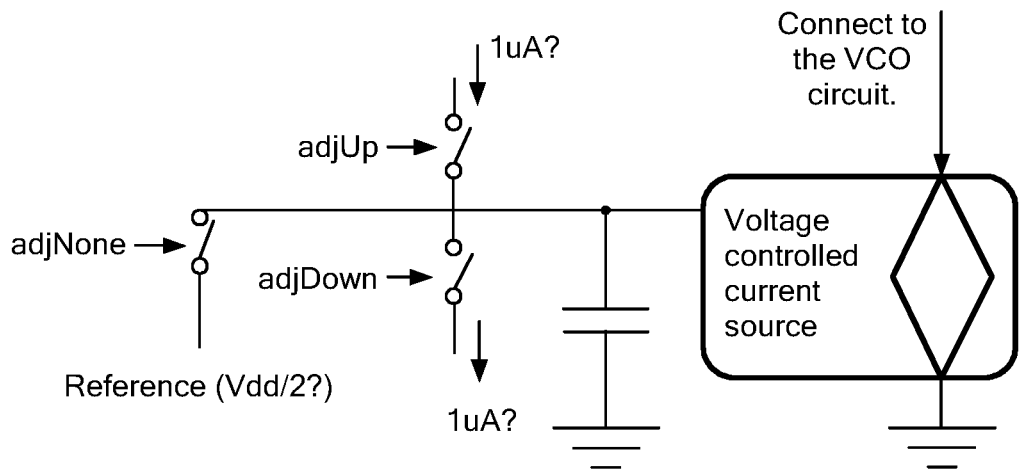
FIG. 12 is an example circuit implementation of the PLL of FIG. 11.

FIG. 12 shows one example implementation in which an adjUp pulse will charge a capacitor, and the adjDown pulse will discharge the capacitor. If the function is disabled, adjNone is on, and the voltage is forced to a reference voltage (Vdd/2 for example). The voltage on the capacitor will control a current source which adds extra current from the VCO circuit. The range of the adjustment is 2 LSBs of the trim bits. It may be desirable to trim the oscillator as close as possible to the 3.125 MHz, and the error will be compensated on the fly if this function is enabled.

The clock speed control mode works with the closed loop speed. It may not work with open loop, constant torque mode or constant power mode. Higher frequency on the SPD pin will drive a higher motor speed as follows:

$$\text{close\_loop\_speed (rpm)} = \text{clock\_input} \times \text{speed\_ctrl\_ratio}.$$

where the speed_ctrl_ratio can be programmed in the EEPROM. For example, if the ratio is 4 and the clock input frequency is 60 Hz, the motor will operate at 240 rpm. Note the number of motor pole pairs must be set properly in the programming application for the rated speed (RPM) setting to be accurate.

Figure 13:
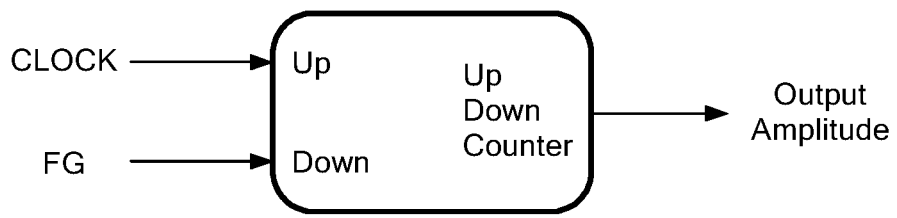
FIG. 13 is an example clock mode implantation.

FIG. 13 shows an example implementation in a counter goes up and down based on the input CLOCK signal and the motor FG signal (or multiply of the FG signal depends on the speed_ctrl_ratio. The counter controls the amplitude command.

Figure 14:
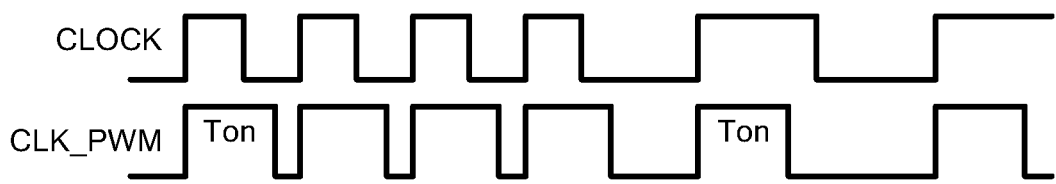
FIG. 14 is a waveform diagram of clock signals for the clock mode of FIG. 13.

In some embodiments, the current loop is implemented after the speed loop and there is a requirement of independently controlling the speed loop time constant and speed_ctrl_ratio. In other embodiments, it is desirable to extract the CLOCK frequency, such as by 'borrowing' from PWM demodulation, as shown in FIG. 14.

Figure 15:
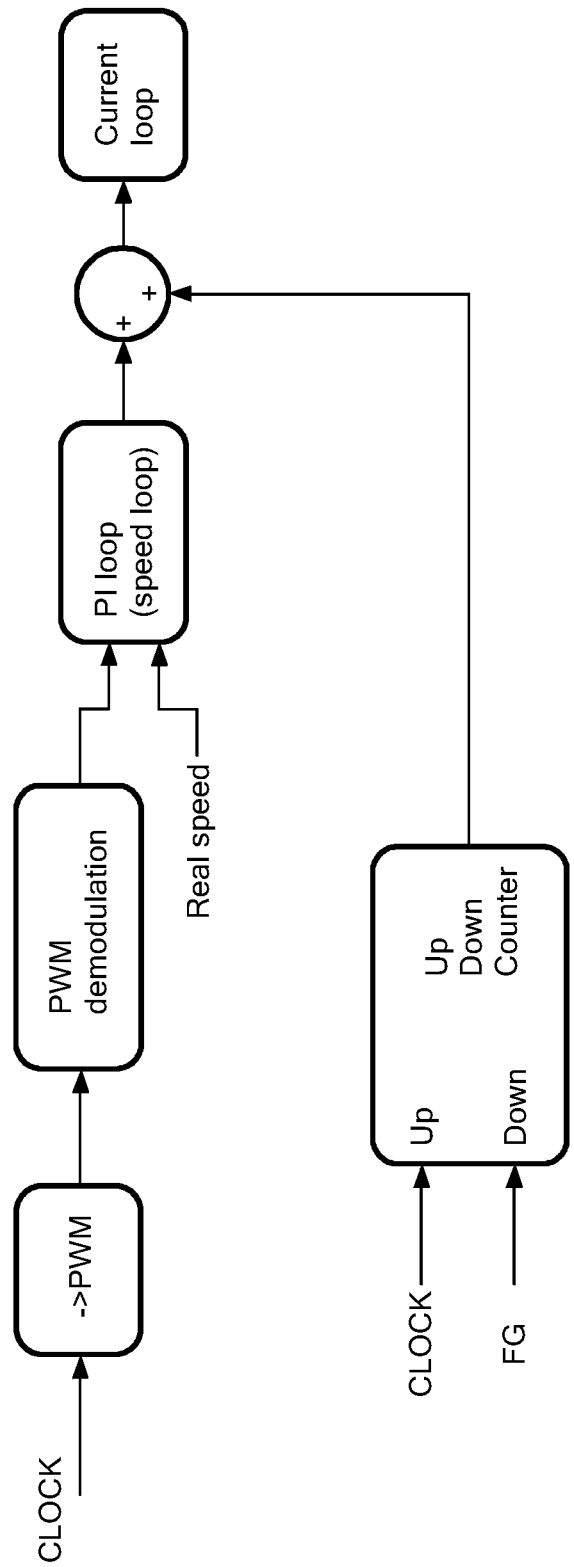
FIG. 15 is a block diagram of an example hybrid implementation of a clock mode.

FIG. 15 shows an example hybrid implementation of CLOCK mode. The clock signal may be 50% duty cycle. We take the rising edge of the CLOCK signal and go through a 'monostable trigger circuit' to generate a CLK_PWM signal, which has the same frequency and where the 'on' period Ton is fixed. So the duty cycle is changed with the frequency of CLOCK changed. This signal is fed into the PWM demodulation processing and the output represents the CLOCK frequency. The Ton time is determined by the maximum speed of the system, (not rated speed but the 100% target speed). Higher speeds will have a smaller Ton, so that it takes higher CLOCK frequency to reach the target speed. The converted PWM duty cycle, or the CLOCK frequency, is used for the PI speed loop comparing with real speed and followed by the current loop. Because the digital implementation may have quantization error, there may be a fraction error between the real speed and the CLOCK reference speed. The PLL circuit works at the same time as a complementary method to compensate the fraction error after the PI speed loop. Because it only takes the fraction of the error, this block may have only a few bits.

Figure 16:
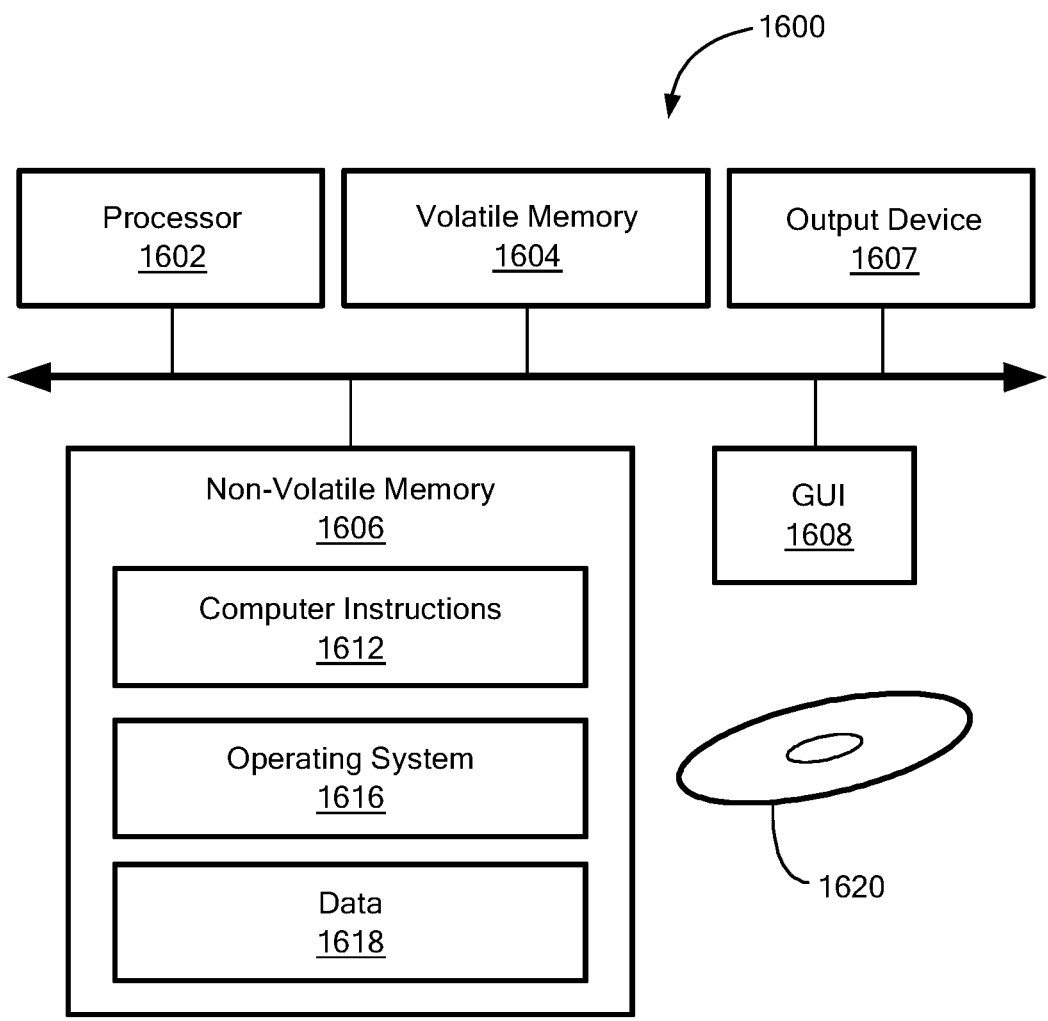
FIG. 16 is an illustrative computer that can perform at least a portion of the processing described herein.

FIG. 16 shows an exemplary computer 1600 that can perform at least part of the processing described herein. The computer 1600 includes a processor 1602, a volatile memory 1604, a non-volatile memory 1606 (e.g., hard disk), an output device 1607 and a graphical user interface (GUI) 1608 (e.g., a mouse, a keyboard, a display, for example). The non-volatile memory 1606 stores computer instructions 1612, an operating system 1616 and data 1618. In one example, the computer instructions 1612 are executed by the processor 1602 out of volatile memory 1604. In one embodiment, an article 1620 comprises non-transitory computer-readable instructions.

Processing may be implemented in hardware, software, or a combination of the two. Processing may be implemented in computer programs executed on programmable computers/machines that each includes a processor, a storage medium or other article of manufacture that is readable by the processor (including volatile and non-volatile memory and/or storage elements), at least one input device, and one or more output devices. Program code may be applied to data entered using an input device to perform processing and to generate output information.

The system can perform processing, at least in part, via a computer program product, (e.g., in a machine-readable storage device), for execution by, or to control the operation of, data processing apparatus (e.g., a programmable processor, a computer, or multiple computers). Each such program may be implemented in a high level procedural or object-oriented programming language to communicate with a computer system. However, the programs may be implemented in assembly or machine language. The language may be a compiled or an interpreted language and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network. A computer program may be stored on a storage medium or device (e.g., CD-ROM, hard disk, or magnetic diskette) that is readable by a general or special purpose programmable computer for configuring and operating the computer when the storage medium or device is read by the computer. Processing may also be implemented as a machine-readable storage medium, configured with a computer program, where upon execution, instructions in the computer program cause the computer to operate.

Processing may be performed by one or more programmable processors executing one or more computer programs to perform the functions of the system. All or part of the system may be implemented as, special purpose logic circuitry (e.g., an FPGA (field programmable gate array) and/or an ASIC (application-specific integrated circuit)).

Having described exemplary embodiments of the invention, it will now become apparent to one of ordinary skill in the art that other embodiments incorporating their concepts may also be used.

The embodiments contained herein should not be limited to disclosed embodiments but rather should be limited only by the spirit and scope of the appended claims. All publications and references cited herein are expressly incorporated herein by reference in their entirety.

Elements of different embodiments described herein may be combined to form other embodiments not specifically set forth above. Various elements, which are described in the context of a single embodiment, may also be provided separately or in any suitable subcombination. Other embodiments not specifically described herein are also within the scope of the following claims.

What is claimed is:

1. A method, comprising:
    employing a curve transformer for controlling a three-phase motor, wherein the curve transformer has an index value for each stored input value and output value for providing stored corner points for outputs of the curve transformer;
    wherein the curve transformer outputs interpolated data for input data between adjacent ones of the input values.

2. The method according to claim 1, wherein the interpolated data comprises linear interpolated data.

3. The method according to claim 1, further including employing the curve transformer for controlling motor speed.

4. The method according to claim 1, further including employing the curve transformer for controlling motor torque.

5. The method according to claim 1, further including employing the curve transformer for controlling motor power.

6. The method according to claim 1, further including employing the curve transformer for controlling motor control demand.

7. The method according to claim 1, wherein the index values, the input values and the output values provide steps in the output of the curve transformer.

8. The method according to claim 1, wherein the output of the curve transformer is not monotonic.

9. The method according to claim 1, further including employing the curve transformer using polar FOC in a motor controller IC package.

10. The method according to claim 7, wherein the steps include hysteresis.

11. A motor controller IC package, comprising:
    a processer and memory configured to provide:
    a curve transformer having an index value for each stored input value and output value for providing stored corner points for outputs of the curve transformer;
    wherein the curve transformer outputs interpolated data for input data between adjacent ones of the input values.

12. The motor controller IC package according to claim 11, wherein the interpolated data comprises linear interpolated data.

13. The motor controller IC package according to claim 11, wherein the curve transformer is configured to control a three-phase motor.

14. The motor controller IC package according to claim 11, wherein the index values, the input values and the output values provide steps in the output of the curve transformer.

15. The motor controller IC package according to claim 11, wherein the output of the curve transformer is not monotonic.

16. The motor controller IC package according to claim 13, wherein the curve transformer is configured to control motor speed.

17. The motor controller IC package according to claim 13, wherein the curve transformer is configured to control motor torque.

18. The motor controller IC package according to claim 13, wherein the curve transformer is configured to control motor power.

19. The motor controller IC package according to claim 13, wherein the curve transformer is configured to control motor control demand.

20. The motor controller IC package according to claim 13, wherein the curve transformer is configured for polar FOC motor control.

21. The motor controller IC package according to claim 14, wherein the steps include hysteresis.

22. A method, comprising:
employing a curve transformer controlling a three-phase motor, the curve transformer having an index value for each stored input value and output value for providing stored corner points for outputs of the curve transformer,
wherein the curve transformer outputs interpolated data for input data between adjacent ones of the input values, and wherein the input data comprises one or more of motor speed, motor torque, motor power, and/or motor control demand.

23. The method according to claim 22, further including employing the curve transformer using polar FOC in a motor controller IC package.

24. A motor controller IC package, comprising:
a processor and memory configured to provide a curve transformer to control a three-phase motor, the curve transformer having an index value for each stored input value and output value for providing stored corner points for outputs of the curve transformer,
wherein the curve transformer outputs interpolated data for input data between adjacent ones of the input values, and wherein the input data comprises one or more of motor speed, motor torque, motor power, and/or motor control demand.

25. The motor controller IC package according to claim 24, wherein the interpolated data comprises linear interpolated data.

* * * * *

UNITED STATES PATENT AND TRADEMARK OFFICE
CERTIFICATE OF CORRECTION

PATENT NO. : 11,736,047 B2
APPLICATION NO. : 16/819765
DATED : August 22, 2023
INVENTOR(S) : Yisong Lu It is certified that error appears in the above-identified patent and that said Letters Patent is hereby corrected as shown below:

In the Specification

Column 4, Line 38, delete "value co" and replace with --value $\omega$--.

Column 4, Line 39, delete "θe and 00" and replace with --θe and θ0--.

Column 5, Line 37, delete "IB = Ipeak*sin($\omega$t-240°)," and replace with --IC = Ipeak*sin($\omega$t-240°),--.

Column 5, Line 48, delete "speed co" and replace with --speed $\omega$--.

Column 6, Line 21, delete "I_driving =thus*1.732/amplitude_command." and replace with --1_driving =Ibus*1.732/amplitude_command.--.

Column 7, Line 9, delete "20% (100/511)" and replace with --20% ($\approx$100/511)--.

Column 7, Line 11, delete "(450/511)." and replace with --($\approx$450/511).--.

Signed and Sealed this
Thirtieth Day of July, 2024

Katherine Kelly Vidal
*Director of the United States Patent and Trademark Office*